United States Patent [19]

Johannes et al.

[11] 4,223,097
[45] Sep. 16, 1980

[54] POWDER BINDER COMPOSITION COMPRISING AN EPOXY RESIN, A POLYESTER RESIN AND AN ACCELERATOR

[75] Inventors: Gerhard Johannes, Taunusstein; Hermann Hotze, Auringen, both of Fed. Rep. of Germany

[73] Assignee: Hoechst Aktiengesellschaft, Frankfurt, Fed. Rep. of Germany

[21] Appl. No.: 961,409

[22] Filed: Nov. 16, 1978

Related U.S. Application Data

[63] Continuation of Ser. No. 774,530, Mar. 4, 1977, abandoned.

[30] Foreign Application Priority Data

Mar. 6, 1976 [DE] Fed. Rep. of Germany ....... 2609361

[51] Int. Cl.² .............. C08L 63/02; C08L 67/02
[52] U.S. Cl. .............. 525/107; 260/37 EP; 428/418; 525/115; 525/438
[58] Field of Search .............. 260/835, 836, 837 R; 525/107, 438; 428/418

[56] References Cited

U.S. PATENT DOCUMENTS

| | | | |
|---|---|---|---|
| 3,324,198 | 6/1967 | Gruver | 260/836 |
| 3,896,082 | 7/1975 | Rensmann et al. | 528/94 |
| 3,966,836 | 6/1976 | de Cleur et al. | 260/835 |

*Primary Examiner*—Theodore E. Pertilla
*Attorney, Agent, or Firm*—Quaintance, Murphy & Richardson

[57] ABSTRACT

A powder binder composition comprising a mixture of (I) an epoxy resin, (II) a hardener comprising a polyester having free carboxylic groups, and (III) from 0.05 to 5% by weight based on the weight of component II of an accelerator comprising at least one compound of the formulae

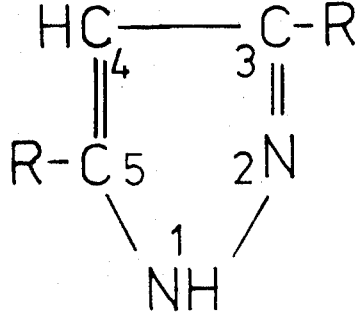

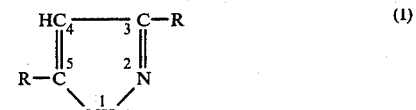
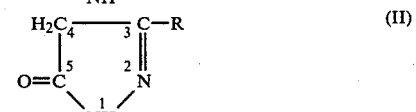
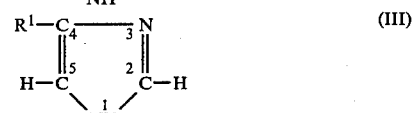
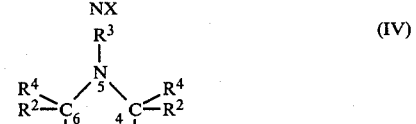
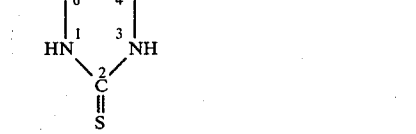
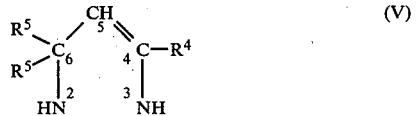

wherein
R represents a hydrogen atom or a $C_{1-4}$ alkyl group,
$R^1$ represents a hydrogen atom or a nitro group,
$R^2$ represents a hydrogen atom or a $C_{1-4}$ alkyl, $C_{2-4}$ alkenyl group or a phenyl group,
$R^3$ represents a hydrogen atom or a $C_{1-7}$ alkyl group,
$R^4$ represents a $C_{1-12}$ alkyl group or a phenyl group,
$R^5$ represents a hydrogen atom or an aryl or $C_{1-6}$ alkyl group, and
X represents a hydrogen atom or a vinyl or $C_{1-4}$ alkyl group and an article coated with said composition.

11 Claims, 1 Drawing Figure

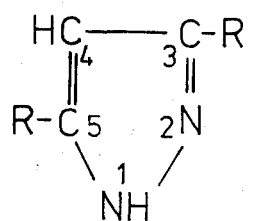
(I)
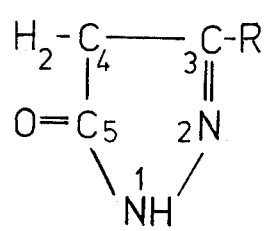
(II)
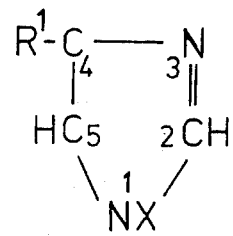
(III)
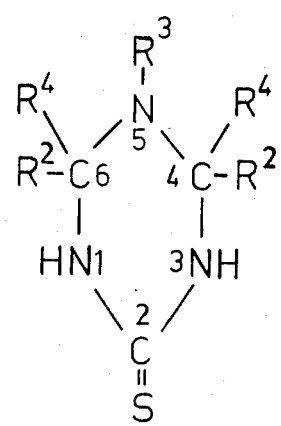
(IV)
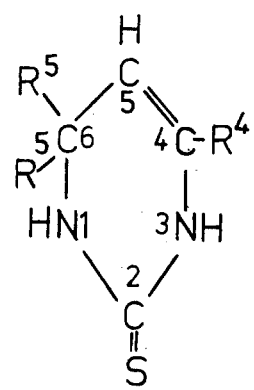
(V)
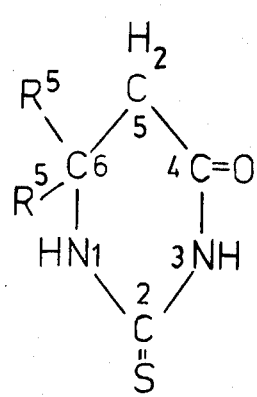
(VI)
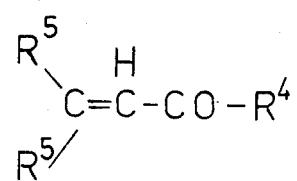
(VII)

POWDER BINDER COMPOSITION COMPRISING AN EPOXY RESIN, A POLYESTER RESIN AND AN ACCELERATOR

This is a continuation of copending application, Ser. No. 774,530, filed Mar. 4, 1977 now abandoned.

This invention relates to powder coating compositions having the property of rapid hardening.

Coatings or moulded articles formed by crosslinking polyepoxide compounds with polyesters with free carboxyl groups by thermal hardening have been described. Cross-linked coatings or moulded articles from polyepoxide compounds by thermal hardening in the presence of heterocyclic catalysts have also been described. These coatings or moulded articles are distinguished by having high mechanical strength and relatively good resistance to detergents, but they have an unsatisfactory resistance to discoloration.

Furthermore, powdered coating compositions based on epoxy resins and reaction products of a polyester and a polycarboxylic anhydride have also been described. Such coatings have the disadvantages, however, that on being baked at 150° C. for 30 minutes, coatings are obtained which are either not sufficiently cross-linked and have insufficient resistance to discoloration or else laminations are obtained which are not sufficiently resistant to discoloration.

Mixtures consisting of epoxy resins, polyesters with free acid groups as hardeners and tertiary amines as accelerators have also been described. Among the amines for use as accelerators, 2-ethyl-4-methylimidazole has been mentioned, in addition to aromatic and araliphatic compounds. However, this substance is a liquid and therefore presents problems in the production and processing of powdered binders.

Finally, the preparation of coatings from powdered enamels based on epoxy resins and substituted imidazolidines has been described, the imidazolidines being present in a proportion of from 2 to 10, preferably 3 to 5 percent by weight. These coatings may be hardened at 140° to 200° C. in 5 to 20 minutes, whereby discoloration is supposed to be prevented. These mixtures do not contain any further resins as binders. However, as tests have shown, mixtures of epoxy resins, imidazolines and additional polyester resins result in an undesirable dark coloration on hardening, with the result that mixtures of this kind are not suitable for the preparation of acceptable coatings.

A powdered binder based on mixtures of epoxy resins, polyesters with free carboxyl groups as hardeners and an accelerator has now been found which substantially reduces the disadvantages described above.

Thus according to the present invention there is provided a powder binder composition comprising a mixture of (I) an epoxy resin,
(II) a hardener comprising a polyester having free carboxylic groups, and
(III) from 0.05 to 5% by weight based on the weight of component II of an accelerator comprising at least one compound of the formula

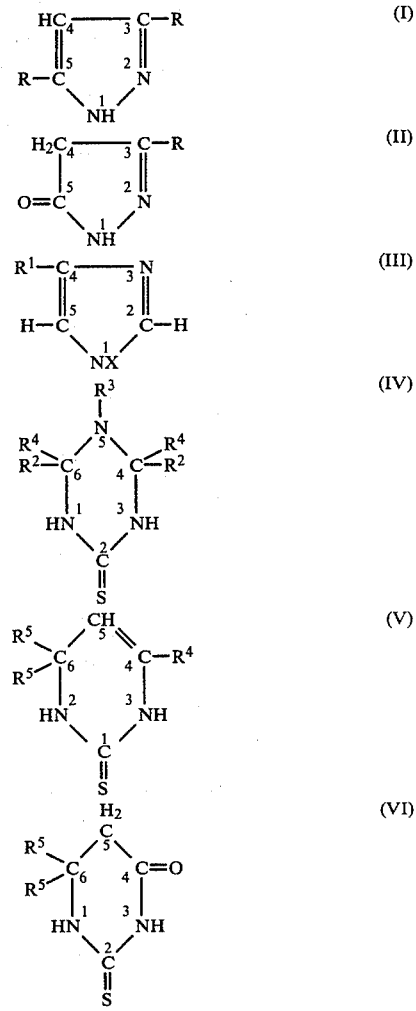

[wherein R represents a hydrogen atom or a $C_{1-4}$ alkyl group, $R^1$ represents a hydrogen atom or a nitro group,
$R^2$ represents a hydrogen atom or a $C_{1-4}$ alkyl, $C_{2-4}$ alkenyl such as vinyl, or a phenyl group,
$R^3$ represents a hydrogen atom or a $C_{1-7}$ alkyl group,
$R^4$ represents a $C_{1-12}$ alkyl group or a phenyl group,
$R^5$ represents a hydrogen atom or an aryl or $C_{1-6}$ alkyl (including cycloalkyl) group, and
X represents a hydrogen atom or a vinyl or $C_{1-4}$ alkyl group].

The formula for component III of the compositions hereof are further illustrated in the attached sheet of drawings wherein the substituent groups have the significance set out above.

In the drawings
FIG. 1 corresponds to Formula I;
FIG. II corresponds to Formula II;
FIG. III corresponds to Formula III;
FIG. IV corresponds to Formula IV;
FIG. V corresponds to Formula V;
FIG. VI corresponds to Formula VI; and
FIG. VII corresponds to Formula VII.

Surprisingly, the binders according to the invention yield, after hardening, coatings resistant to discoloration and having a high impact strength and a good resistance to detergents.

Preferred accelerators for use in the compositions according to the invention are those of formula I such as pyrazole or a 3,5-dialkylpyrazole (with 1 to 4 carbon atoms in each alkyl group) and particularly dimethylpyrazole; those of formula II such as pyrazol-5-one or a 3-alkylpyrazol-5-one having 1 to 4 carbon atoms in the alkyl group, such as 3-methylpyrazol-5-one, 3-propyl-or 3-butyl-pyrazol-5-one, but particularly 3-methylpyrazol-5-one; those of formula III, such as imidazole; those of formula IV, such as 2-thiono-hexahydro-1,3,5-triazine, optionally substituted in at least one of the 4-, 5- or 6-positions by at least one of the groups $R^2$ to $R^4$; those of formula V such as 2-thiono-1,2,3,6-tetrahydropyrimidine, optionally substituted by at least one of the groups $R^4$ and $R^5$ in at least one of the 4- and 6-positions; and those of formula VI such as 2-thiono-4-oxo-hexahydropyrimidine optionally substituted with at least one of the groups $R_5$ in the 6-position. 3,5-Dimethylpyrazole of formula I may be obtained, for example, by reacting acetylacetone with hydrazine in known manner. The compounds of formula II may be obtained, for example, by reacting an ester of acetoacetic acid with hydrazine. The compounds of formula IV can be prepared, for example, by the reaction of thiourea, an aliphatic aldehyde, such as formaldehyde, acetaldehyde, propionaldehyde or butyraldehyde or benzaldehyde, with ammonia or with an amine containing 1 to 12 carbon atoms, such as methyl-, ethyl-, propyl-, or butylamine and the higher homologues thereof. 4,6,6-Trimethyl-2-thiono-1,2,3,6-tetrahydropyrimidine of formula V may be prepared, for example, from $\alpha,\beta$-unsaturated compounds of formula

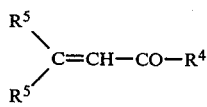
(VII)

(wherein $R^4$ and $R^5$ are as defined above) e.g. from mesityl oxide and thiourea, as described in German Patent Specification No. 1,065,849. The compounds of formula VI may be prepared, for example, from the reaction of crotonic, acrylic or methacrylic acid or the esters thereof with thiourea.

Binders for use in the compositions according to the invention containing 2-thiono-5-N-methylhexahydro-1,3,5-triazine, 2-thiono-4-methyl-6,6-dimethyl-1,2,3,6-tetrahydro-pyrimidine are preferred, but the most preferred binder is imidazole.

The polyesters used in the present invention preferably have an acid number of from 5 to 200, generally from 30 to 180, and advantageously from 70 to 130. Suitable polyesters are, for example, those based on terephthalic acid, isophthalic acid, o-phthalic acid, adipic acid, 1,8-naphthalene dicarboxylic acid, tetrachlorophthalic acid, tetrahydrophthalic acid, endomethylene tetrahydrophthalic acid, hexachloroendomethylene tetrahydrophthalic acid, trimellitic acid, trimesic acid, pyromellitic acid, cyclopentadiene dicarboxylic acid, cyclopentane tetracarboxylic acid, cyclohexane dicarboxylic acid, benzophenone tetracarboxylic acid, bicyclo-octene tricarboxylic acid, maleic acid, fumaric acid, itaconic acid or Diels-Alder adducts of maleic anhydride or other $\alpha,\beta$-unsaturated dicarboxylic acids or mixtures thereof. In many cases, polyesters based on terephthalic acid and diols are preferred. Suitable alcohol components are, for example, dihydric alcohols with 2 to 24 carbon atoms, such as ethylene glycol, propane diols, butane diols, Δ2,3-butenediol-1,4, dimethylolcyclohexane, 2,2-dimethyl-propanediol-1,3, hexanediol, diethyleneglycol, triethyleneglycol, dihydroxybutyl ether, hydrogenated bisphenol, 4,4'-dihydroxydiphenylpropane or -methane, ethoxylated and propoxylated bisphenol or correspondingly modified bisphenol, diols additionally containing ether groups, such as the dimethyl of pentaerythritol or the monomethyl ethers of trimethylol-ethane or -propane. The diols may also be used in admixture with higher functionality alcohols, e.g. trimethylol-ethane or -propane, pentaerythritol, hexanetriol etc. However, the proportion of alcohols or acids with a functionality greater than two should generally not make up more than 70 mol %, e.g. not more than 50 equivalent percent of the alcohol or acid component, in order to avoid undesirable crosslinking.

As the carboxyl group-containing polyester resins, ester group-containing copolymers additionally containing free carboxyl groups may be at least partially used. Suitable copolymers are, for example, those obtained from mono- or dibasic acids such as acrylic acid, methacrylic acid, maleic acid, fumaric acid or crotonic acid, with other copolymerisable monomers, such as styrene, ethylene, esters of acrylic or methacrylic acid, acrylo- or methacrylonitrile, acryl- or methacrylamide, allyl compounds such as diallyl phthalate or the like.

Suitable epoxy resins for use in the present invention are, for example, those based on polyhydric phenols, such as 4,4'-diphenylolpropane, 4,4'4''-triphenylolpropane, 4,4'-diphenylolmethane, and epihalohydrins, preferably epichlorohydrin or glycerol dihalohydrin, which may optionally be substituted by, for example, alkyl, alkoxy, halogen and/or nitro groups.

The epoxy values of the epoxy resins are generally between 0.05 and 0.25 and the epoxide equivalent weights between 500 and 1500, preferably 700 and 1000. Their viscosities (in 40% diethyleneglycol monobutyl ether solution at 25° C.) may be within the range from 80 to 5000 cP, for example.

The weight ratio of epoxy resin to polyester in the compositions according to the invention may be, for example 80:20 to 20:80, preferably 40:60 to 60:40. In individual cases, the weight ratio may be outside this range. The accelerator component (III) is preferably present in an amount of 0.1 to 1% by weight based on the weight of the polyester component.

The melting point of the polyester and epoxy resins is generally above 50° C., preferably above 65° C. and is advantageously not more than 150° C.

The two resins may be mixed together at temperatures of between 70 and 130, preferably between 90° and 110° C., e.g. in a kneader. It is also possible for the binder composition to additionally contain fillers, pigments and/or other conventional additives, such as lubricants, flow agents, or anti-cratering agents. Suitable organic and inorganic fillers are, for example, sawdust, cellulose powder, textile off-cuts, asbestos powder, ground limestone, dolomite, finely divided silica, particularly powdered quartz, powdered glass, calciumaluminium silicates, mica etc. Suitable pigments are, for example, titanium dioxide, zinc oxide, carbon black, iron oxide red, iron oxide black, cadmium yellow, and chromium oxide.

It is advisable to mix the additives into the melt of one of the resins, preferably the polyester resin, in order to obtain a more homogenous mixture.

After the melt has solidified, it is advantageously extruded in an extrusion press for further homogenisation and the extruded strip thus obtained is then ground to a powder.

The particle size of the powder may generally be between 30 and 200 μm, whilst generally particles within the range from 30 to 100 μm are used for spray coating using the compositions according to the invention and those within the range from 30 to 200 μm are used when coating by whirl sintering.

Using the powdered compositions according to the invention, coatings may be applied to all kinds of articles, particularly those made from heat-resistant materials, such as, for example, metals and ceramics. Examples of articles which may be coated are domestic appliances, shelving, metal furniture, vehicles or parts thereof, agricultural machinery or parts thereof, lamp bases, heating elements, windows and door frames. If desired, the coatings can then hardened by subsequent heating. In the case of larger moulded articles, it is also possible to heat them first, then apply the powder and use the heat capacity of the article to harden the coating, provided the accelerator is sufficiently effective. The embodiment is of particular interest if thicker layers are desired.

The coatings are generally applied so that they have a layer thickness of 35 to 400, preferably 50 to 200 μm, this ensures good protection of the edges. Using an electrostatic process, for example, layer thicknesses of e.g. 35 to 100 μm are obtained, and using a whirl sintering process thicknesses of at least 100 μm are generally obtained. These thermally hardened coatings are in no way inferior to enamel coatings prepared from solutions in the conventional way. In particular, a good protection from corrosion is obtained.

It is also possible to use the binders according to the invention to produce moulded articles.

In the Examples, all percentages are percentages by weight and the letter, T, is used to represent parts by weight.

Preparation of the carboxyl group—containing polyester resins (A) 57 T of terephthalic acid, 45 T of neopentyl glycol, 13 T of trimellitic anhydride, and 0.15 T of imidazole are condensed together at 180° to 230° C. until the product has an acid number of 120.

(B) The same process is used as for polyester (A) but instead of imidazole, 0.3 T of 2-thiono-5-N-methyl-hexahydro-1,3,5-triazine are used. A product with an acid number of 115 is obtained.

(C) The same method is used as for polyester A but instead of the imidazole, 0.4 T of 2-thiono-4-methyl-6,6-dimethyl-1,2,3,6-tetrahydro-pyrimidine are used. The product has an acid number of 125.

(D) 57 T of terephthalic acid, 40 T of neopentyl glycol and 14 T of trimellitic anhydride are condensed together in the presence of 0.3 T of imidazole and 0.2 T of 2-thiono-5-N-methyl-hexahydro-1,3,5-triazine at 180° to 230° C. until the product has an acid number of 180.

(E) 54 T of terephthalic acid, 48 T of neopentyl glycol and 13 T of trimellitic anhydride are reacted in the presence of 0.2 T of imidazole at 180° to 230° C. until the polyester has an acid number of 65.

(F) 57 T of phthalic anhydride, 48 T of neopentyl glycol and 13 T of trimellitic anhydride are condensed together in the presence of 0.15 T of imidazole at 180° to 230° C. until the product has an acid number of 85.

(G) 35 T of isophthalic acid, 20 T of adipic acid, 45 T of neopentyl glycol and 12 T of trimellitic anhydride are condensed in the presence of 0.1 T of imidazole at 180° to 230° C. until the product has an acid number of 100.

(H) 70 T of methyl methacrylate and 30 T of methacrylic acid are polymerised in the presence of 0.2 T of imidazole and 2 T of benzyl peroxide for 5 hours at 80° C. The copolymer obtained has an acid number of 200.

(I) (Comparison) 57 T of terephthalic acid, 45 T of neopentyl glycol and 13 T of trimeellitic anhydride are codensed together as in the case of polyester (A), but in the absence of any of the substances of formula I to VI.

Epoxy resin

An epoxy resin is prepared from 4,4'-diphenylolpropane and epichlorohydrin having an epoxide value of 0.1 to 0.11, an epoxide equivalent weight of 875 to 1000, a melting point of 93° to 104° C. (according to Durrans) and a dynamic viscosity (40% diethylene glycol monobutylether) of 430 to 630 cP.

EXAMPLES

Preparation of the powdered binder

The polyesters mentioned above are homogenously mixed with the epoxy resin and the pigment in the same ratio of quantities and then powdered.

(1) to (8) and comparison (9) 350 T of polyesters A to H or I, for comparison, are intimately mixed with 300 T of titanium dioxide in a melt. 350 T of epoxy resin are then added. After cooling, in the manner conventional for electrostatic coating, the melt is plasticised and homogenised and ground to a maximum particle size of 50 to to 100 μm. In the case of the powder mixture obtained from polyester I, the powder does not contain a hardener.

Technical Tests of the Enamel

The powdered binders are electrostatically applied to a phosphatised steel sheet to a thickness of 50 to 100 μm. The coating obtained is baked at 150° C. for 30 minutes and is subjected to the impact test according to ASTM D 2794-69, the Erichsen depression test according to DIN 53156, the detergent resistance test according to ASTM D 2248 and the acetone and xylene tests. The resistance to detergents is tested with a 1.5% detergent solution at 74° C. which is left to react for up to 240 hours. The acetone and xylene tests are carried out by applying a cotton wool pad soaked in the test solvent to the coating and covering with a watch glass or a Petri dish. The pad is left for 30 seconds in each case, and the results assessed according to DIN 53203 (0=best value, 5=worst value).

Test results

The results of the technical lacquer tests are shown in the following Table:

| Sample acc. to Example | 1 | 2 | 3 | 4 | 5 | 6 | 7 | 8 | 9 (co: |
|---|---|---|---|---|---|---|---|---|---|
| Impact test | 160 | 140 | 120 | 160 | 140 | 120 | 160 | 140 | 4, |
| Acetone test 30 sec. | 2.5 | 3 | 3 | 3 | 2.5 | 3 | 2.5 | 3 | 5, |

-continued

| Sample acc. to Example | 1 | 2 | 3 | 4 | 5 | 6 | 7 | 8 | 9 (co: |
|---|---|---|---|---|---|---|---|---|---|
| xylene test 30 sec. | 0 | 0 | 0 | 0 | 0 | 0 | 0 | 0 | 1, |
| Erichsen depression mm. | 9.3 | 9.1 | 8.9 | 8.2 | 9 | 8.2 | 9.0 | 8.3 | 3.2, |
| detergent resistance h. | 240 | 220 | 220 | 260 | 180 | 160 | 230 | 260 | 50 |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A powder binder composition comprising a mixture of
   (I) an epoxy resin based on polyhydric phenols and epihalohydrins,
   (II) a hardener comprising a polyester having free carboxylic groups, and which constituents of said polyester have been reacted during the polycondensation or polymerization with from 0.05 to 5% by weight based on the weight of constituents of component II of an accelerator comprising at least one compound of the formulae

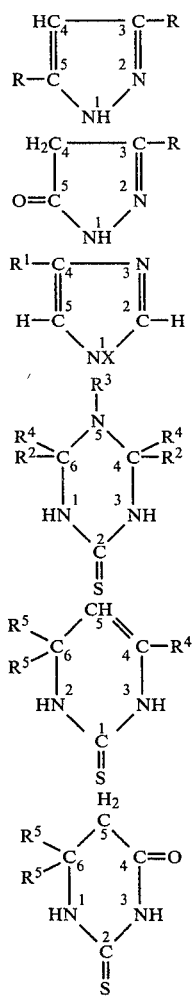

wherein $R$ represents a hydrogen atom or a $C_{1-4}$ alkyl group,
$R^1$ represents a hydrogen atom
$R^2$ represents a hydrogen atom or a $C_{1-4}$ alkyl, $C_{2-4}$ alkenyl group or a phenyl group,
$R^3$ represents a hydrogen atom or a $C_{1-7}$ alkyl group,
$R^4$ represents a $C_{1-12}$ alkyl group or a phenyl group,
$R^5$ represents a hydrogen atom or an aryl or $C_{1-6}$ alkyl group, and
$X$ represents a hydrogen atom or a vinyl or $C_{1-4}$ alkyl group, said polyester reactant II having an acid number between 100 and 200 is selected from the group consisting of (a) polyesters derived from polyols and an aromatic acid, or an aromatic acid containing at most 42.5% as much by weight of an aliphatic or cycloaliphatic acid and (b) a copolymer containing ester groups and carboxyl groups.

2. A composition as claimed in claim 1 wherein the compound of formula I is obtained by reaction of acetylacetone with hydrazine; the compound of formula II is prepared by reaction of an ester of acetoacetic acid with hydrazine; the compound of formula IV is prepared by the reaction of thiourea, an aldehyde selected from the group consisting of an aliphatic aldehyde and an amino compound selected from the group consisting of ammonia and an amine containing 1 to 12 carbon atoms, 4,6,6-trimethyl-2-thiono-1,2,3,6-tetrahydropyrimidine of formula V is prepared from an α,β-unsaturated compound of formula

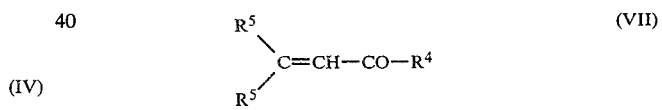

wherein $R^4$ and $R^5$ are as defined in claim 1 and thiourea; and the compound of formula VI is prepared by the reaction of an unsaturated monocarboxylic unit selected from the group consisting of crotonic, acrylic and methacrylic acid and the esters thereof with thiourea.

3. A composition as claimed in claim 1 wherein the proportion of alcohols or acids with a functionality greater than two in polyester (II) is at most 70 mol% of the alcohol or acid component respectively.

4. A composition as claimed in claim 1 wherein the polyester (II) comprises a polyester of terephthalic acid and a diol and the epoxy resin is based on 4,4-diphenylolpropane and epichlorohydrin.

5. A composition as claimed in claim 1 wherein the polyester is at least partially an ester group-containing copolymer additionally containing free carboxylic groups.

6. A composition as claimed in claim 1 wherein the polyester (II) is a copolymer based on (a) an at most dicarboxylic acid selected from the group consisting of acrylic, methacrylic, maleic and crotonic acid and (b) a copolymerisable monomer selected from the group consisting of an acrylic ester, methacrylic ester, acrylic amide, methacrylic amide, acrylonitrile and methacrylonitrile, an allyl compound, styrene and ethylene.

7. A composition as claimed in claim 1 wherein the epoxy resin has an epoxy value between 0.05 and 0.25, an epoxide equivalent weight between 500 to 1,500 and a viscosity (in 40% diethylene glycol monobutyl ether solution at 25° C.) in the range from 80 to 5,000 cP.

8. A composition as claimed in claim 1 wherein the weight ratio of the epoxy resin to the polyester is in the range from 80:20 to 20:80.

9. A composition as claimed in claim 1 wherein the melting point of the polyester and epoxy resin is above 50° C. and not higher than 150° C.

10. A composition as claimed in claim 1 additionally containing at least one substance selected from the group consisting of fillers, pigments and other conventional additives and wherein the powder composition has a particle size between 30 and 200 μm.

11. An article coated with a coating composition as claimed in claim 1.

* * * * *